United States Patent
Aoki et al.

(10) Patent No.: US 11,535,008 B2
(45) Date of Patent: Dec. 27, 2022

(54) LAMINATED GLASS

(71) Applicant: AGC Inc., Chiyoda-ku (JP)

(72) Inventors: Tokihiko Aoki, Tokyo (JP); Shunsuke Sadakane, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 408 days.

(21) Appl. No.: 16/826,358

(22) Filed: Mar. 23, 2020

(65) Prior Publication Data

US 2020/0215798 A1 Jul. 9, 2020

Related U.S. Application Data

(63) Continuation of application No. PCT/JP2018/038149, filed on Oct. 12, 2018.

(30) Foreign Application Priority Data

Oct. 20, 2017 (JP) .............................. JP2017-203911

(51) Int. Cl.
| | |
|---|---|
| *B32B 7/12* | (2006.01) |
| *B32B 17/10* | (2006.01) |
| *B32B 27/30* | (2006.01) |
| *H05B 3/86* | (2006.01) |

(52) U.S. Cl.
CPC .. *B32B 17/10761* (2013.01); *B32B 17/10036* (2013.01); *B32B 17/10348* (2013.01); *B32B 17/10385* (2013.01); *B32B 27/30* (2013.01); *H05B 3/86* (2013.01); *B32B 2305/345* (2013.01); *B32B 2307/102* (2013.01); *B32B 2307/304* (2013.01); *B32B 2315/08* (2013.01); *B32B 2329/06* (2013.01); *B32B 2457/00* (2013.01); *B32B 2605/006* (2013.01); *B32B 2605/08* (2013.01)

(58) Field of Classification Search
CPC .................... B32B 17/10036; B32B 17/10761
See application file for complete search history.

(56) References Cited

U.S. PATENT DOCUMENTS

| | | | |
|---|---|---|---|
| 4,820,902 | A | 4/1989 | Gillery |
| 6,011,244 | A | 1/2000 | Castle et al. |
| 2017/0015180 | A1 | 1/2017 | Sakamoto et al. |
| 2018/0149867 | A1 | 5/2018 | Kremers et al. |

FOREIGN PATENT DOCUMENTS

| | | |
|---|---|---|
| CA | 2076420 C | 2/1993 |
| CN | 106103158 A | 11/2016 |
| CN | 106489095 A | 3/2017 |
| CN | 106526854 A | 3/2017 |

(Continued)

*Primary Examiner* — Elizabeth E Mulvaney
(74) *Attorney, Agent, or Firm* — Element IP, PLC (57) ABSTRACT

A laminated glass having an interlayer between a glass plate on an exterior side of a vehicle and a glass plate on an interior side of the vehicle, includes a heat generator on a principal surface on a vehicle-exterior side of the glass plate that is on the interior side of the vehicle, wherein at least one of the glass plate on the exterior side of the vehicle and the glass plate on the interior side of the vehicle has a wedge shape in cross section, and wherein a maximum value of a layer thickness of the interlayer is less than or equal to 1 mm.

13 Claims, 6 Drawing Sheets

(56) References Cited

FOREIGN PATENT DOCUMENTS

| | | | | |
|---|---|---|---|---|
| CN | 106630688 A | | 5/2017 | |
| CN | 108349799 A | * | 7/2018 | ....... B32B 17/10036 |
| DE | 4227582 C2 | | 2/1993 | |
| JP | 07-175007 A | | 7/1995 | |
| JP | 09-207718 A | | 8/1997 | |
| WO | WO-2005048656 A1 | * | 5/2005 | ........... A61K 31/519 |
| WO | WO-2015086233 A1 | | 6/2015 | |

* cited by examiner

|  | THERMAL CONDUCTIVITY [W/mK] | SPECIFIC HEAT [kJ/kgK] | SPECIFIC GRAVITY [g/cm³] |
|---|---|---|---|
| GLASS PLATE (INNER PLATE, OUTER PLATE) | 1 | 838 | 2.5 |
| INTERLAYER | 0.19 | 1260 | 1.1 |

FIG.6

| | THICKNESS OF LAYERS AT 1000 mm FROM LOWER SIDE | | | WEDGE ANGLE [mrad] | TIME TO DEFROST AT MEASUREMENT POINT [MIN.] | DIFFERENCE FROM COMP. EX. [MIN.] | SURFACE TEMP. OF OUTER PLATE IN STEADY STATE [°C] | DIFFERENCE FROM COMP. EX. [°C] |
|---|---|---|---|---|---|---|---|---|
| | INNER PLATE GLASS [mm] | INTERLAYER PVB [mm] | OUTER PLATE GLASS [mm] | | | | | |
| EX. 1 | 2 | 0.76 | 2+WEDGE SHAPE | 0.6 | 25.0 | -1.0 | 9.8 | 0.5 |
| EX. 2 | 2+WEDGE SHAPE | 0.76 | 2 | 0.6 | 24.0 | -2.0 | 9.9 | 0.6 |
| COMP. EX. 1 | 2 | 0.76+WEDGE SHAPE | 2 | 0.6 | 26.0 | — | 9.3 | — |
| EX. 3 | 2 | 0.76 | 2+WEDGE SHAPE | 0.3 | 24.0 | -0.5 | 9.8 | 0.3 |
| EX. 4 | 2+WEDGE SHAPE | 0.76 | 2 | 0.3 | 23.5 | -1.0 | 9.9 | 0.4 |
| COMP. EX. 2 | 2 | 0.76+WEDGE SHAPE | 2 | 0.3 | 24.5 | — | 9.6 | — |
| EX. 5 | 1.6 | 0.76 | 2+WEDGE SHAPE | 0.6 | 21.5 | -1.5 | 9.7 | 0.4 |
| EX. 6 | 1.6+WEDGE SHAPE | 0.76 | 2 | 0.6 | 20.5 | -2.5 | 9.9 | 0.6 |
| COMP. EX. 3 | 1.6 | 0.76+WEDGE SHAPE | 2 | 0.6 | 23.0 | — | 9.3 | — |

LAMINATED GLASS

CROSS-REFERENCE TO RELATED APPLICATIONS

This U.S. non-provisional application is a continuation application of, and claims the benefit of priority under 35 U.S.C. § 365(c) from, PCT International Application PCT/JP2018/038149 filed on Oct. 12, 2018, which is designated the U.S., and is based upon and claims the benefit of priority of Japanese Patent Application No. 2017-203911 filed on Oct. 20, 2017, the entire contents both of which are incorporated herein by reference.

TECHNICAL FIELD

The present disclosure relates to laminated glass.

BACKGROUND ART

In recent years, introduction of head-up displays (also referred to as "HUD", below) has made progress, with which predetermined information is displayed in the field of vision of the driver of a vehicle, by reflecting images on the windshield of the vehicle. However, there may be cases where double images (transmitted double images and reflected double images) pose a problem when the driver is visually recognizing an outside scene or information displayed by the HUD.

Thereupon, in the HUD, in order to solve the problem of double images, technologies to make the cross section of a windshield wedge-shaped have been adopted. For example, a laminated glass compatible with HUD has been proposed, in which an interlayer having a wedge shape in cross section is sandwiched between two glass plates, to have a wedge shape as a whole (see, for example, Japanese Unexamined Patent Application Publication No. H07-175007).

Meanwhile, in order to clear off snow, ice, frost, and the like stuck on the exterior surface of a windshield so as to keep the visibility of the windshield, a laminated glass having an electrical heating function has been known (see, for example, Japanese Unexamined Patent Application Publication No. H09-207718).

In a laminated glass having such a heating function, a heat generator including hot wires or a film is installed on the principal surface on the vehicle-exterior side of the glass plate that is on the interior side of the vehicle. The heating function is also required for an HUD-compatible laminated glass described above.

However, in the HUD-compatible laminated glass described above, an interlayer having a wedge shape in cross section is used; therefore, in the upper part of the laminated glass, namely, a part where the layer thickness of the interlayer is greater, heat from the heat generator does not reach easily to the glass plate on the exterior side of the vehicle; therefore, there is a likelihood that snow, ice, frost and the like may not be sufficiently cleared off.

SUMMARY

According to an embodiment, a laminated glass having an interlayer between a glass plate on an exterior side of a vehicle and a glass plate on an interior side of the vehicle, includes a heat generator on a principal surface on a vehicle-exterior side of the glass plate that is on the interior side of the vehicle, wherein at least one of the glass plate on the exterior side of the vehicle and the glass plate on the interior side of the vehicle has a wedge shape in cross section, and wherein a maximum value of a layer thickness of the interlayer is less than or equal to 1 mm.

EMBODIMENTS OF THE INVENTION

In the following, embodiments will be described with reference to the drawings.

According to the disclosed technology, it is possible to efficiently transmit heat from a heat generator to the glass plate on the exterior side of the vehicle in a laminated glass that has a wedge shape in cross section, and is HUD-compatible.

Throughout the drawings, the same elements are assigned the same reference symbols, and duplicated description may be omitted. Note that although a windshield for vehicles will be taken as an example for the description here, the application is not limited as such; a laminated glass according to the embodiments can be applied to glasses other than a windshield for vehicles. Also, in some of the drawings, the size and shape may be partially exaggerated to facilitate understanding of the contents of the present invention.

Figure 1A:
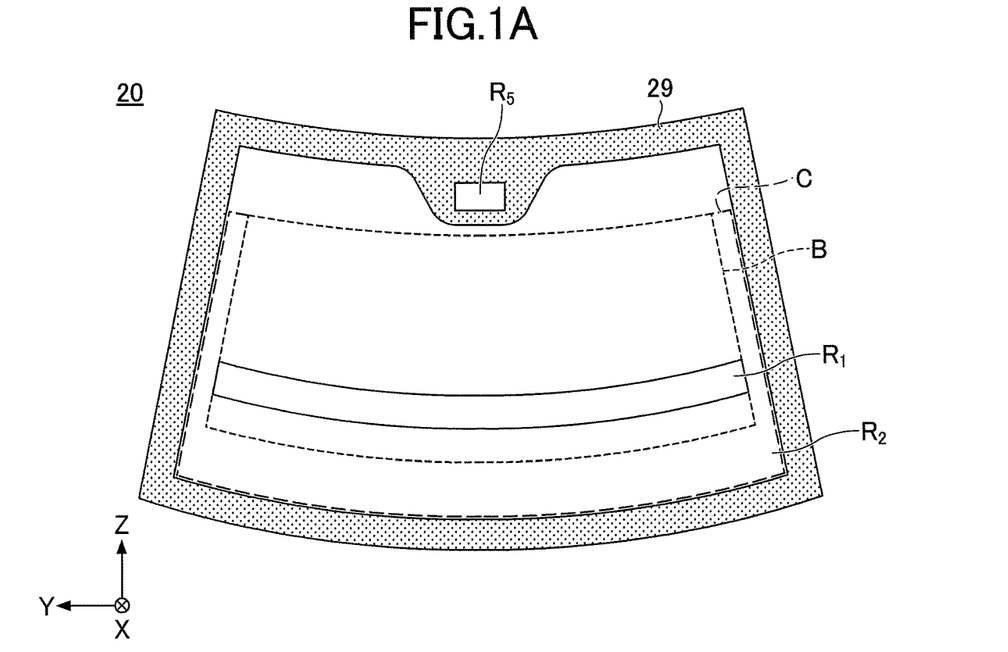
FIGS. 1A-1B are diagrams illustrating a windshield for a vehicle.
Figure 1B:
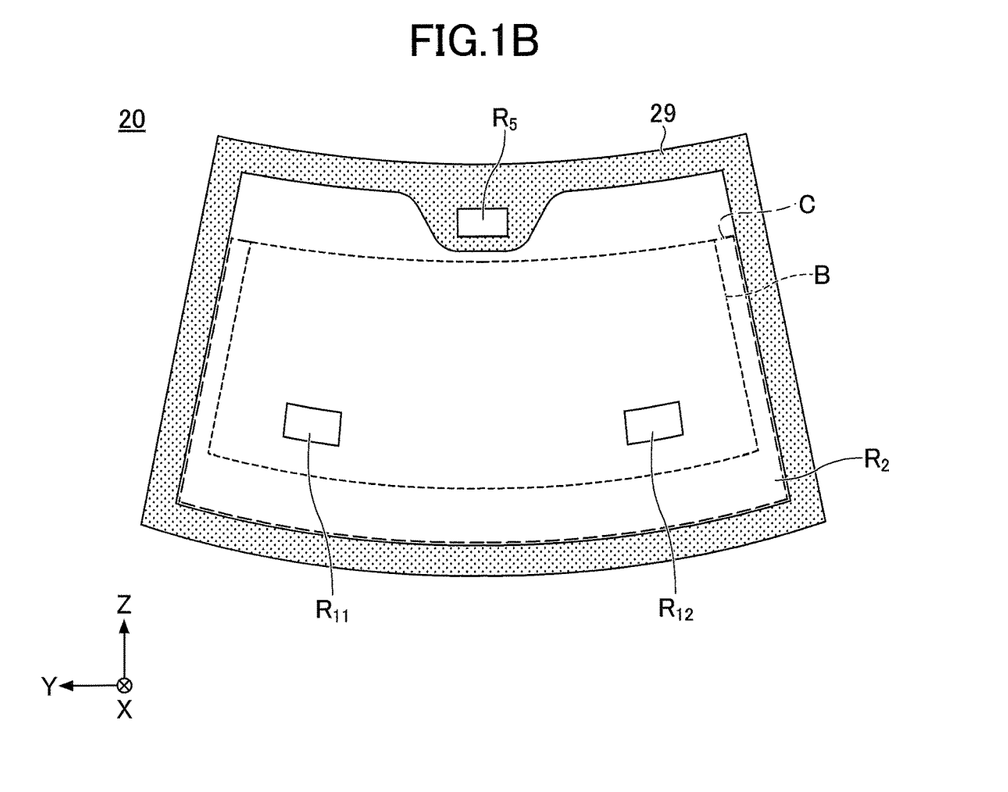

FIGS. 1A-1B are diagrams exemplifying a windshield for a vehicle, which are diagrams schematically illustrating a state in which the windshield is visually recognized from the vehicle interior to the vehicle exterior.

As illustrated in FIG. 1A, the windshield 20 has an HUD display area $R_1$ used by an HUD and an HUD non-display area $R_2$ not used by the HUD. The HUD display area $R_1$ covers a range, in the case where viewed from a point V1 of JIS R3212, on which the windshield 20 is irradiated with light from a mirror that constitutes the HUD, when the mirror is rotated. Note that in the present specification, the transparent area includes a test area C specified in JIS R3212, and an information transmission/reception area in the case where the information transmission/reception area described below is included, and indicates an area where the visible light transmittance Tv is greater than or equal to 70%.

The HUD display area $R_1$ is located in the lower half of the windshield 20, and the HUD non-display area $R_2$ is adjacent to the HUD display area $R_1$, and located around the HUD display area $R_1$ of the windshield 20. However, the HUD display area may be arranged in multiple locations in the Y direction, for example, like an HUD display area $R_{11}$ and an HUD display area $R_{12}$ illustrated in FIG. 1B. Alternatively, the HUD display area may be only one of the HUD display area $R_{11}$ and the HUD display area $R_{12}$. Alternatively, the HUD display area may be arranged in multiple locations in the Z direction (not illustrated).

It is favorable to arrange the HUD display areas $R_1$, $R_{11}$, and $R_{12}$ outside the test area A specified in JIS R3212. The HUD display areas $R_1$, $R_{11}$, and $R_{12}$ may be arranged in the test area A specified in JIS R3212. Note that the test area A is provided inside the test area B, although not illustrated in FIGS. 1A-1B. In FIGS. 1A-1B, B and C indicate test areas B and C specified in JIS R3212, respectively.

It is favorable that a black ceramic layer 29 (shielding layer) is present in the peripheral part of the windshield 20. The black ceramic layer 29 may be formed by applying black ceramic printing ink to a glass surface to be stained. The presence of the opaque black ceramic layer 29 in the peripheral part of the windshield 20 enables to prevent an adhesive such as urethane for holding the peripheral part of the windshield 20 from being deteriorated by ultraviolet rays.

In the case where only the interlayer of the windshield 20 has a wedge angle as in the conventional techniques, in a part where the layer thickness of the interlayer becomes greater, an ultraviolet absorber in the interlayer has a greater effect of controlling deterioration due to ultraviolet rays. In the case where the glass plate has a wedge angle as in the present invention, the maximum value of the layer thickness of the interlayer becomes smaller; therefore, it is favorable to have a black ceramic layer in the peripheral part of the windshield 20. Also, in the present invention, by having a black ceramic layer in the peripheral part of the windshield 20, heat from the heat generator can be easily transmitted to the outer surface side of the vehicle.

The windshield 20 may have an information transmission/reception area $R_5$ in an upper-side peripheral part. The information transmission/reception area $R_5$ may be arranged, for example, at an opening formed in the black ceramic layer 29. The information transmission/reception area $R_5$ functions as a transparent area in the case where a camera, a laser for distance measurement, and the like are arranged on the upper-side peripheral part of the windshield 20.

Figure 2:
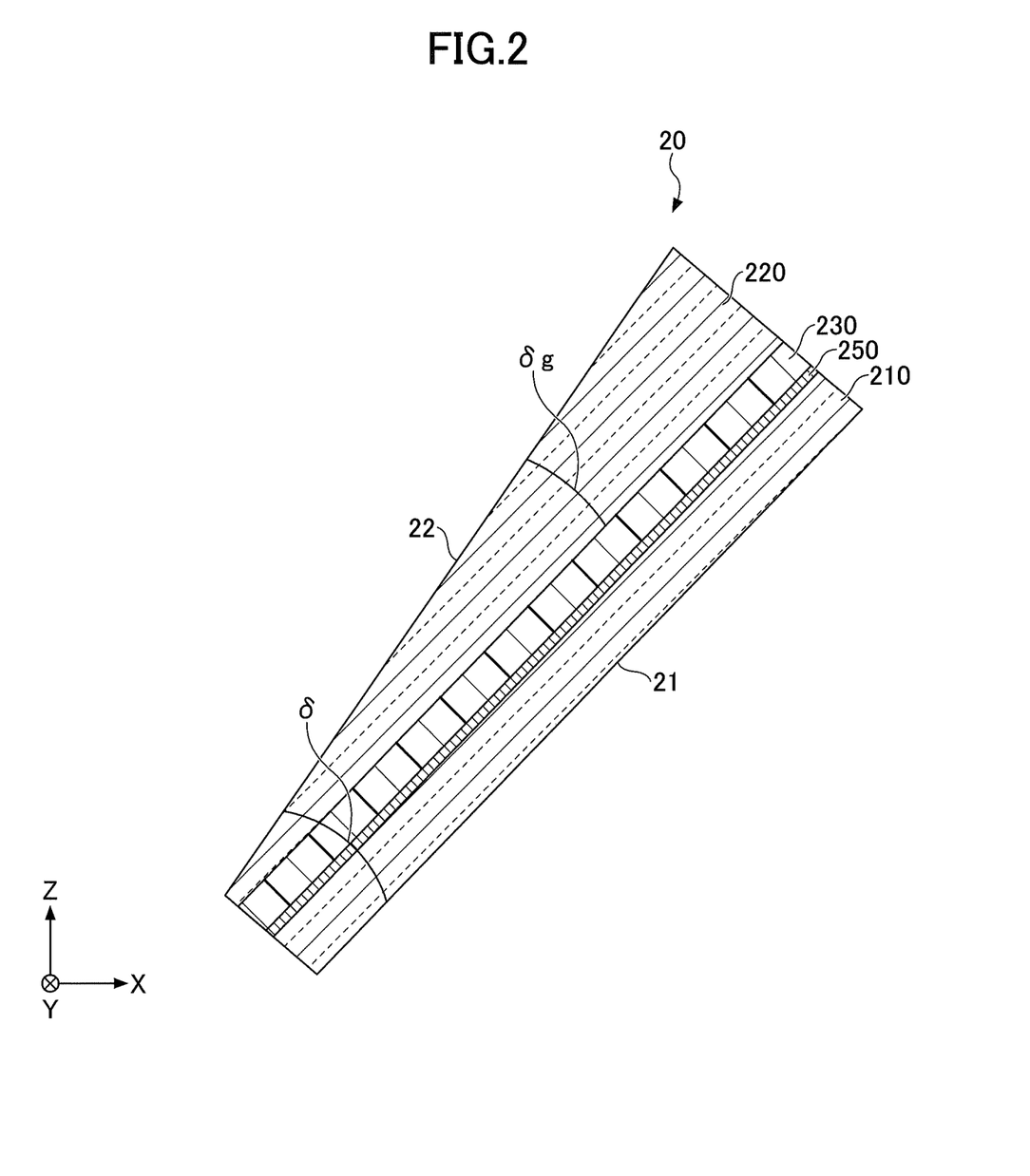
FIG. 2 is a first partial cross-sectional view of the windshield 20 illustrated in FIG. 1 sectioned in the XZ direction and viewed in the Y direction.

FIG. 2 is a partial cross-sectional view of the windshield 20 illustrated in FIG. 1 sectioned in the XZ direction and viewed in the Y direction. As illustrated in FIG. 2, the windshield 20 is a laminated glass for vehicles provided with a glass plate 210 as the glass plate on the interior side of the vehicle; a glass plate 220 as the glass plate on the exterior side of the vehicle; and an interlayer 230. In the windshield 20, the glass plate 210 and the glass plate 220 are fixed in a state of having the interlayer 230 sandwiched in-between.

A heat generator 250 is provided on the principal surface on the exterior side of the vehicle of the glass plate 210. Providing the heat generator 250 enables to defrost (thaw) frozen water stuck on the outer surface 22 of the windshield 20, and to clear off (defog) cloudiness of the outer surface 22 of the windshield 20. The heat generator 250 is not limited in particular; for example, a so-called heat wire type in which metal wires such as tungsten wires are arranged, a so-called coating type in which a transparent conductive film is formed on the glass through which a current flows to generate heat, a so-called film type in which conductive wiring has, for example, a mesh shape, in a base material, and the like may be listed.

In the windshield 20, the inner surface 21 of the windshield 20 as one of the surfaces of the glass plate 210 on the interior side of the vehicle, and the outer surface 22 of the windshield 20 as one of the surfaces of the glass plate 220 on the exterior side of the vehicle may be flat surfaces, or may be curved surfaces.

The windshield 20 is formed to have a wedge shape in cross section such that the thickness increases as it extends from the lower end side to the upper end side of the windshield 20 when the windshield 20 is mounted on the vehicle, where δ represents the wedge angle. Note that the wedge angle δ is defined as a value obtained by dividing the difference between the thickness at the lower end and the thickness at the upper end in the vertical direction along the windshield 20, by the distance in the vertical direction along the windshield 20 (i.e., a mean of the wedge angle). In the following, the wedge angles of a glass plate and an interlayer are similarly defined as above. Note that the increase in thickness from the lower end side to the upper end side of the windshield 20 may be a monotonic increase in which the increasing rate is constant or the increasing rate may vary partially.

The wedge angle δ of the windshield 20 as a laminated glass is favorably greater than or equal to 0.2 mrad and less than or equal to 1.0 mrad; more favorably greater than or equal to 0.3 mrad and less than or equal to 1.0 mrad; even more favorably greater than or equal to 0.3 mrad and less than or equal to 0.9 mrad; and particularly favorably greater than or equal to 0.3 mrad and less than or equal to 0.8 mrad. Having the wedge angle δ greater than or equal to the lower limit enables to sufficiently reduce transmitted double images while controlling the HUD double images. Also, having the wedge angle δ less than or equal to the upper limit enables to control the increase in the mass of the windshield 20 within a range within which no problem would occur, and not to hinder the heat from the heat generator 250 from being transmitted to the outside of the vehicle.

In the windshield 20, the glass plate 220 is formed to have a wedge shape in cross section, and the thicknesses of the glass plate 210 and the interlayer 230 are uniform, respectively. In the glass plate 220, an angle formed between the surface serving as the outer surface 22 of the windshield 20 and the surface contacting the interlayer 230 is the wedge angle δg.

The wedge angle δg of a glass plate having a wedge shape in cross section (in FIG. 2, the glass plate 220) is favorably greater than or equal to 0.2 mrad and less than or equal to 1.0 mrad; more favorably greater than or equal to 0.3 mrad and less than or equal to 1.0 mrad; even more favorably greater than or equal to 0.3 mrad and less than or equal to 0.9 mrad; and particularly favorably greater than or equal to 0.3 mrad and less than or equal to 0.8 mrad. Having the wedge angle δg to be greater than or equal to the lower limit enables to sufficiently reduce transmitted double images while controlling the HUD double images. Also, having the wedge angle δg to be less than or equal to the upper limit enables not to hinder the heat from the heat generator 250 from being transmitted to the outside of the vehicle around the upper end of the windshield 20, and to control the increase in mass of the windshield 20 within a range within which no problem would occur.

In the case where both the glass plate and the interlayer 230 have a wedge shape in cross sections, the sum of the wedge angle δg of the glass plate and the wedge angle of the interlayer 230 may be adjusted so as to be within an appropriate range of the wedge angle δ of the windshield 20.

In FIG. 2, the thicknesses of the glass plate 210 and the interlayer 230 are uniform, respectively; therefore, the wedge angle δg of the glass plate 220 is equal to the wedge angle δ formed by the inner surface 21 and the outer surface 22 of the windshield 20 (the wedge angle of the entire laminated glass). In the example in FIG. 2, although only the glass plate 220 has a wedge shape in cross section, both the glass plate 210 and the glass plate 220 may have wedge shapes in cross section (the layer thickness of the interlayer 230 is uniform).

In the case where both of the glass plates 220 and 210 have wedge shapes in cross sections, the wedge angles of the glass plates may be different or may be the same. In either case of one of the glass plates 210 and 220 being a glass having a wedge shape in cross section or both being glasses having wedge shapes in cross section, it is favorable that the wedge angle of the cross section of a glass plate having a wedge shape in cross section is formed such that a wedge angle of a part on the upper side of the glass plate is smaller than a wedge angle of the other part on the lower side, where the part is above the center of a line connecting the midpoint of the upper side and the midpoint of the lower side, and the other part is below the center. The wedge shape in cross section described above prevents too thick a plate thickness of the glass plate close to the upper side, which is unrelated to the HUD display area of the windshield 20; therefore, it does not hinder the heat from the heat generator 250 from being transmitted to the outside of the vehicle.

Note that although it is favorable that the layer thickness of the interlayer 230 is uniform (i.e., the wedge angle of 0 mrad), a slight wedge angle may be generated due to stretching or the like in the manufacturing process of the laminated glass. In this case, if the wedge angle of the interlayer 230 is less than or equal to 0.2 mrad, a part of the interlayer 230 where the layer thickness is greater does not become too thick, and the influence on the thermal conduction from the heat generator 250 is small; therefore, the wedge angle falls within the allowable range. In other words, the wedge angle of the interlayer 230 is favorably less than or equal to 0.2 mrad, more favorably less than or equal to 0.15 mrad, and even more favorably 0.1 mrad.

In the case of forming one or both of the glass plate 210 and the glass plate 220 to have a wedge shape(s) in cross section, if the glass plate is to be formed of inorganic glass and manufactured by a float process, the shape can be obtained by engineering the manufacturing conditions. In other words, by adjusting the revolving speed of multiple rolls arranged on both edges in the width direction of a glass ribbon that travels on molten metal, glass can be formed to have a concave, convex, or tapered cross section in the width direction, which may be cut to obtain a part having a desired thickness change. Also, the surface of the glass plate may be polished so as to be adjusted to a desired wedge angle.

As the glass plates 210 and 220, for example, inorganic glass such as soda-lime glass, aluminosilicate glass, or alkali-free glass; organic glass; or the like can be used. The glass plate 220 located on the exterior side of the windshield 20 is favorably made of inorganic glass from the viewpoint of scratch resistance, and is favorably soda-lime glass from the viewpoint of moldability. It is favorable that the glass plate having a wedge shape in cross section contains iron as an oxide by an amount of greater than or equal to 0.4 mass % and less than or equal to 0.6 mass %. Containing iron among the components makes bending by heating easier thanks to greater heat absorption, even in the case where the plate thickness is thick as in the case of a glass plate having a wedge shape in cross section. Containing iron among the components also reduces the visible light transmittance, makes the heat generator 250 less visible, and thereby, makes the design better.

The plate thickness of the thinnest part of the glass plate 220 located on the exterior side of the windshield 20 is favorably greater than or equal to 1.8 mm and less than or equal to 3 mm. The plate thickness of the glass plate 220 being greater than or equal to 1.8 mm provides a sufficient strength in terms of stone-chip resistance and the like, and the plate thickness being less than or equal to 3 mm prevents the mass of the laminated glass from becoming too heavy, which is favorable in terms of the fuel efficiency of the vehicle. Further, heat from the heat generator 250 is transmitted to the outer surface 22 more easily. The plate thickness of the thinnest part of the glass plate 220 is more favorably greater than or equal to 1.8 mm and less than or equal to 2.8 mm, even more favorably greater than or equal to 1.8 mm and less than or equal to 2.6 mm.

The plate thickness of the glass plate 210 located on the interior side of the windshield 20 is favorably greater than or equal to 0.3 mm and less than or equal to 2.3 mm. The plate thickness of the glass plate 210 being greater than or equal to 0.3 mm brings a satisfactory handling capability, and being less than or equal to 2.3 mm prevents the mass of the windshield 20 from becoming too heavy. However, the plate thickness of the glass plate 210 does not necessarily need to be uniform, and the plate thickness may vary depending on the location as needed. Note that in the case where the glass plate 210 located on the interior side of the windshield 20 has a wedge shape in cross section, it is favorable that the plate thickness at the thinnest part falls within the range described above.

The plate thickness of the glass plate 210 is more favorably greater than or equal to 0.5 mm and less than or equal to 2.1 mm, and even more favorably greater than or equal to 0.7 mm and less than or equal to 1.9 mm. Also, in order to efficiently transmit heat from the heat generator 250 to the outer surface 22, it is better that the thickness of the glass plate 210 is thin so as not to necessitate heat excessively in heating, and the plate thickness of the glass plate 210 is favorably less than or equal to 1.9 mm, and more favorably less than or equal to 1.7 mm.

In the case where the windshield 20 has a curved shape, the glass plates 210 and 220 are applied with bending-forming after shaping by the float process and before bonding with the interlayer 230. The bending-forming is performed by softening the glass by heating. The heating temperature of the glass during the bending-forming is approximately 550° C. to 700° C.

Returning to the description in FIG. 2, as the interlayer 230 to bond the glass plate 210 and the glass plate 220 together, thermoplastic resin is often used; for example, plastic polyvinyl acetal resin, plastic polyvinyl chloride resin, saturated polyester resin, plastic saturated polyester resin, polyurethane resin, plastic polyurethane resin, ethylene acetic acid vinyl copolymer resin, ethylene ethyl acrylate copolymer resin, and the like may be listed, which are thermoplastic resin conventionally used for this kind of application.

Among these, plastic polyvinyl acetal resin is suitably used because it has a superior balance of properties including transparency, weather resistance, strength, adhesive strength, penetration tolerance, impact energy absorption, moisture resistance, heat insulation, and sound insulation. One of these thermoplastic resins may be used singly, or two or more may be used together. The word "plastic" as in the above "plastic polyvinyl acetal resin" means that it is plasticized by adding a plasticizer. The same applies to other plastic resins.

As the polyvinyl acetal resin described above, polyvinyl formal resin obtained by having polyvinyl alcohol (may be referred to as "PVA" below as necessary) react with formaldehyde; polyvinyl acetal resin in a narrow sense obtained by having PVA react with acetaldehyde; polyvinyl butyral resin (may be referred to as "PVB" below as necessary) obtained by having PVA react with n-butyraldehyde; and the like may be listed. Among these, in particular, PVB is suitably used because of its superior balance of properties including transparency, weather resistance, strength, adhesive strength, penetration tolerance, impact energy absorption, moisture resistance, heat insulation, and sound insulation. Note that these polyvinyl acetal resins may be used singly, or two or more may be used together. However, the material for forming the interlayer 230 is not limited to the thermoplastic resin.

The layer thickness of the interlayer 230 is favorably greater than or equal to 0.5 mm at the thinnest part, and more favorably greater than or equal to 0.6 mm. The layer thickness of the interlayer 230 being greater than or equal to the lower limit provides a sufficient penetration resistance required as a windshield. Also, the layer thickness of the interlayer 230 is less than or equal to 1 mm at the thickest part. In the case where the maximum value of the layer thickness of the interlayer 230 is less than or equal to 1 mm, the thermal conduction from the heat generator 250 does not become too small due to the presence of the interlayer 230. Also, the maximum value of the layer thickness of the interlayer 230 being less than or equal to 1 mm enables to prevent the mass of the laminated glass from becoming too heavy. The maximum value of the layer thickness of the interlayer 230 is more favorably less than or equal to 0.95 mm, and even more favorably less than or equal to 0.9 mm.

Note that the interlayer 230 may have three or more layers. For example, by forming the interlayer 230 with three layers and setting the hardness of the middle layer to be lower than the hardness of both of the side layers by adjusting a plasticizer or the like, the sound insulation performance of the laminated glass can be improved. In this case, the hardness of the side layers may be the same or may differ. Here, the hardness of layers of the interlayer 230 can be measured as the Shore hardness. In the case where the interlayer 230 is a sound insulation performance improving film having multiple layers, a phenomenon that thermoplastic resin is melted and deformed by the heat of the heat generator to appear as distortion may tend to occur. In the present invention, it is not necessary to make the layer thickness of the interlayer having lower thermal conductivity unnecessarily thick; therefore, the heat generator does not need to generate an excessive heat generation amount, and thereby, even in the case of the interlayer 230 being a sound insulation performance improving film, the occurrence of distortion can be controlled.

Normally, the light source of an HUD is located in the lower part in the vehicle interior, from which light is projected toward the laminated glass. A projected image is reflected on the back and front surfaces of the glass plates 210 and 220; therefore, in order to superimpose the two reflected images on each other so as to avoid generation of double images, the plate thickness of the glass plate needs to change in parallel with the projection direction. In the case where the plate thickness of the glass plate 220 changes in a direction perpendicular to the streaks, in order to be used as a glass on which information is projected, the glass must be used in a direction where the streak direction is perpendicular to the projection direction; that is, streaks are parallel to the line of sight of an observer (driver) in the vehicle interior, and the visibility is deteriorated by perspective distortion.

In order to improve the visibility, it is favorable that a laminated glass manufactured using the glass plate 210, the glass plate 220, and the interlayer 230 is arranged such that streaks of the glass plate 210 and streaks of the glass plate 220 formed by a float process are perpendicular to each other. This arrangement alleviates distortion that would be worsened by using the glass plate 210 alone, by the presence of the glass plate 220 where the streaks are perpendicular to each other, and of the interlayer 230 that bonds the glass plate 210 with the glass plate 220.

In order to produce an interlayer 230, for example, a resin material to form the interlayer 230 is appropriately selected from among those described above, to which extrusion molding is applied in a heated and molten state by using an extruder. The extrusion conditions such as the extrusion rate of the extruder are set to be uniform. After that, in order to give curvature to the upper side and the lower side according to the design of the windshield 20, for example, the resin layer to which the extrusion molding has been applied is extended as necessary, to complete the interlayer 230.

To manufacture a laminated glass, a laminate is formed by sandwiching the interlayer 230 and the heat generator 250 between a glass plate 210 and a glass plate 220, and then, for example, this laminate is placed in a rubber bag to be bonded in a vacuum of −65 to −100 kPa at a temperature of approximately 70 to 110° C.

Further, applying a press-bonding treatment of heating and pressing to the laminate under conditions of, for example, 100 to 150° C. and a pressure of 0.6 to 1.3 MPa, a laminated glass having more excellent durability can be obtained. However, in some cases, this heating and pressing process may not be used to simplify the process and in consideration of the characteristics of the materials put into the laminated glass.

Note that other than the interlayer 230, a film or device having a function such as infrared reflection, light emission, power generation, light control, visible light reflection, scattering, decoration, absorption, or the like may be provided between the glass plate 210 and the glass plate 220.

Figure 3:
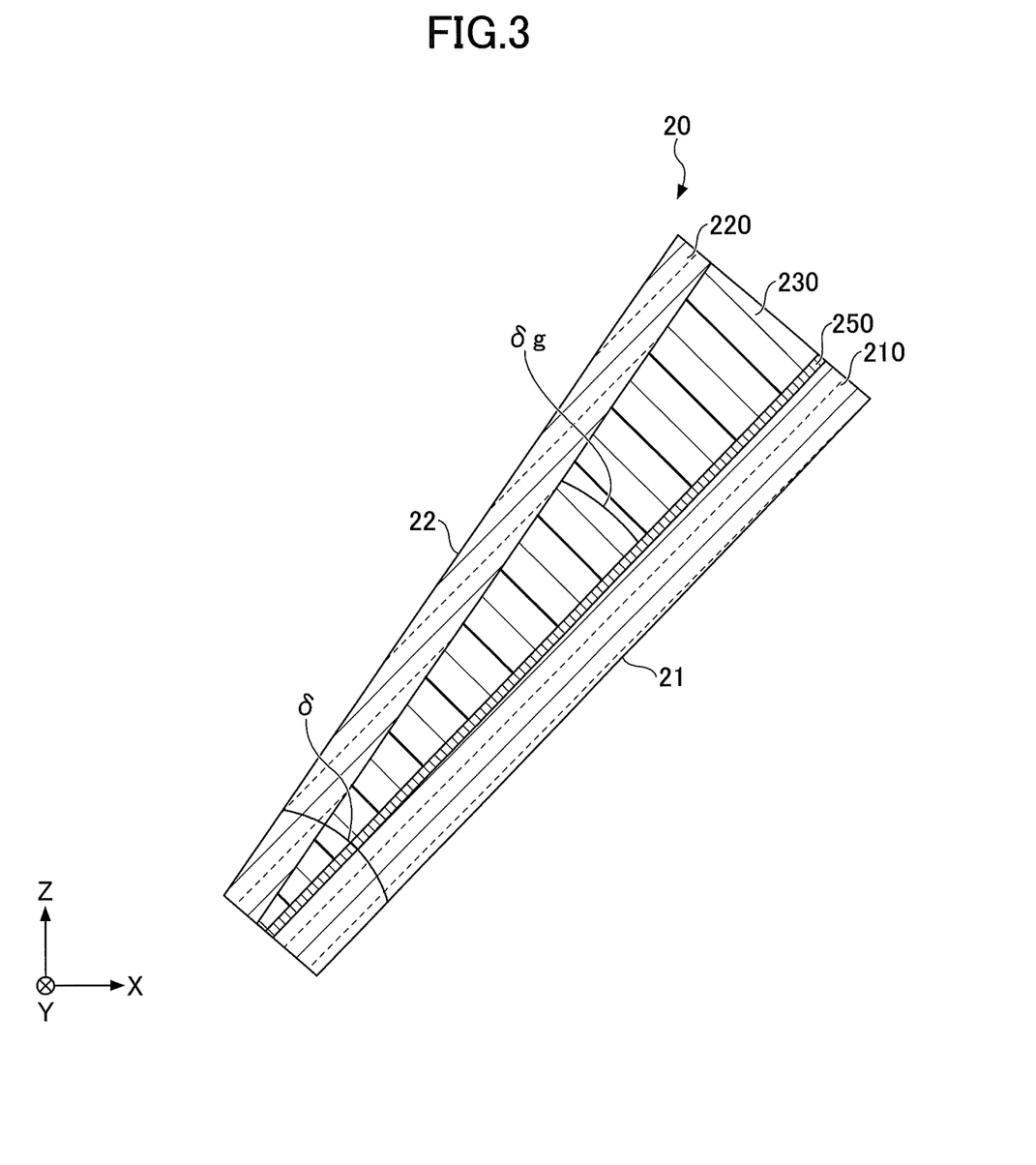
FIG. 3 is a partial cross-sectional view illustrating a windshield according to a comparative example.

FIG. 3 is a partial cross-sectional view illustrating a windshield according to a comparative example, viewed in the same direction as in FIG. 2. As illustrated in the comparative example in FIG. 3, in the windshield that is HUD-compatible, a structure in which the interlayer 230 has a wedge shape in cross section and the plate thicknesses of the glass plates 210 and 220 are uniform is not favorable for the following reasons.

That is, the interlayer 230 has a lower thermal conductivity than the glass plate 210 and the glass plate 220. For example, in the case of the interlayer 230 being polyvinyl butyral resin (PVB), the thermal conductivity at room temperature is approximately 0.19 to 0.21 W/mK, and in the case of ethylene-vinyl acetate copolymer resin (EVA), the thermal conductivity at room temperature is approximately 0.17 W/mK. It is favorable that the interlayer 230 used in the present invention is PVB having a relatively high thermal conductivity.

Note that, in contrast, in the case of the glass plates 210 and 220 being soda-lime glass, aluminosilicate, organic glass, or the like, the thermal conductivity at room temperature is approximately 0.3 to 1.3 W/mK. Among these, soda-lime glass having a relatively high thermal conductivity of 1.0 W/mK is favorable.

Therefore, in the structure illustrated in FIG. 3, in the upper side part where the interlayer 230 is thicker, the distance over which heat is transmitted through the interlayer 230 having low thermal conductivity is longer; therefore, the heat cannot be transmitted efficiently toward the outer surface 22 side (the outside of the vehicle) of the windshield 20. Therefore, the function of defrosting (thawing) frozen water stuck on the outer surface 22 of the windshield 20, or clearing off (defogging) cloudiness of the outer surface 22 of the windshield 20 may not be fully exhibited.

In contrast, as in the structure illustrated in FIG. 2, when the glass plate 220 having a thermal conductivity higher than the interlayer 230 has a wedge shape in cross section, the layer thickness of the interlayer 230 having a lower thermal conductivity is not thicker, whereas the glass plate having the higher thermal conductivity is thicker; therefore, heat from the heat generator 250 can be efficiently transmitted to the outside of the vehicle. As a result, while controlling the HUD double images and maintaining the effect of sufficiently reducing transmitted double images, the function of defrosting (thawing) frozen water stuck on the outer surface 22 of the windshield 20, or clearing off (defogging) cloudiness of the outer surface 22 of the windshield 20 can be fully exhibited.

Figure 4:
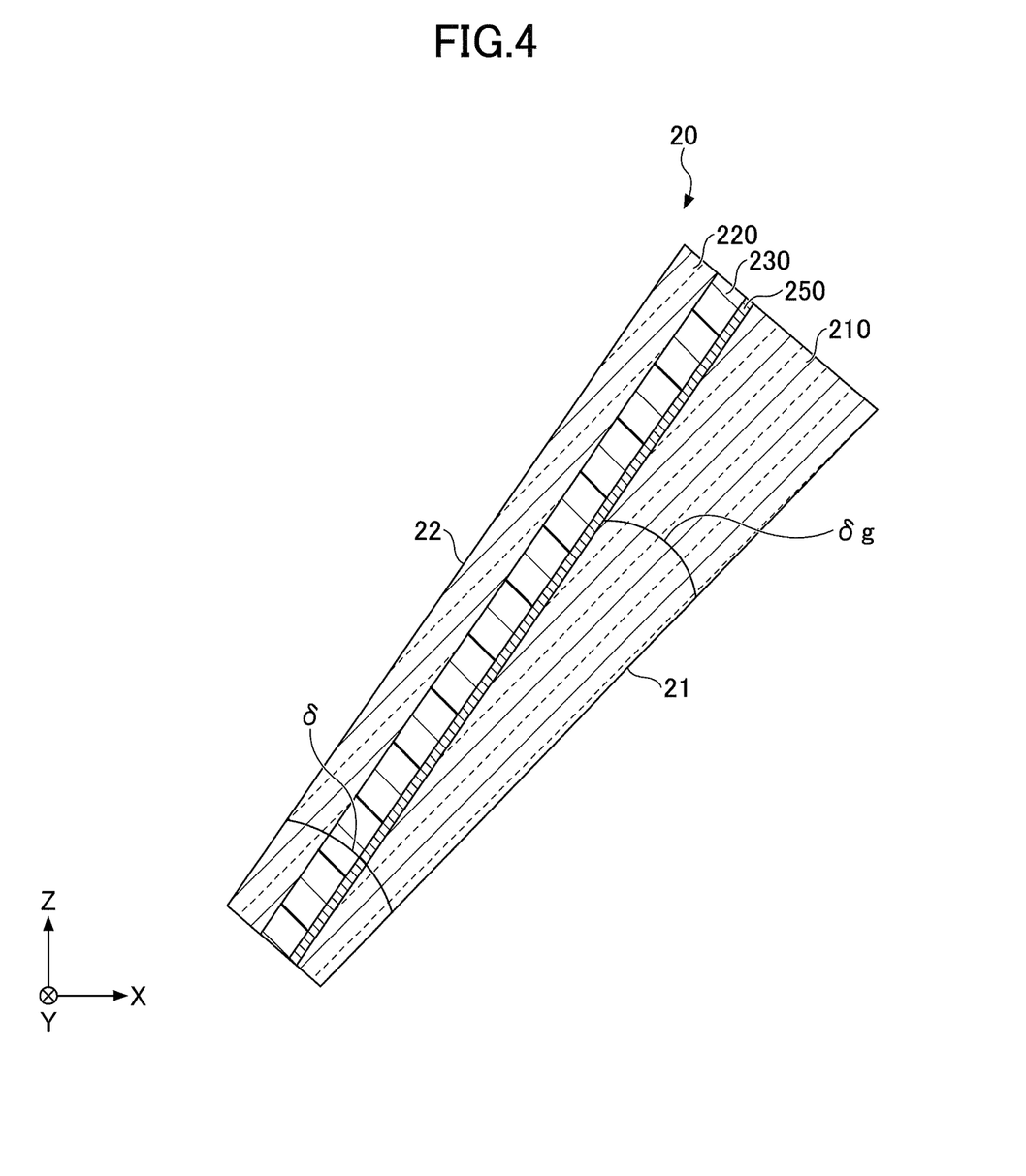
FIG. 4 is a second partial cross-sectional view of the windshield 20 illustrated in FIG. 1 sectioned in the XZ direction and viewed in the Y direction.

Note that although an example is illustrated in FIG. 2 in which the glass plate 220 on the exterior side of the vehicle has a wedge shape in cross section, as illustrated in FIG. 4, the glass plate 210 on the interior side of the vehicle may have a wedge shape. In this case, the heat transfer distance from the heat generator 250 to the outside of the vehicle can be shortened, and the influence caused by forming the glass plate 210 to have a wedge shape in cross section can be eliminated.

The structures illustrated in FIGS. 2 and 4 are particularly effective in the case where the thermal conductivity of the interlayer 230 at room temperature is less than or equal to 0.3 W/mK. Also, this is particularly effective in the case where the heat generation amount per unit area of the heat generator 250 is greater than or equal to 400 W/m$^2$ and less than or equal to 1200 W/m$^2$. In the case where the heat generation amount is less than or equal to 1200 W/m$^2$, the temperature of the windshield does not become too high. In the case where the heat generation amount is greater than or equal to 400 W/m$^2$, a sufficient heating effect can be obtained for the windshield.

Also, the ratio of the plate thickness of a glass plate having a wedge shape in cross section (the glass plate 220 in FIG. 2 or the glass plate 210 in FIG. 4) to the layer thickness of the interlayer 230 at a corresponding position (the plate thickness of the glass plate/the layer thickness of the interlayer) is favorably greater than or equal to 0.7 and less than or equal to 5.0 from the viewpoint of maintaining a good thermal conduction, and also from the viewpoints of the mass and the penetration resistance as a laminated glass. The value of the ratio of the plate thickness of the glass plate to the layer thickness of the interlayer is more favorably greater than or equal to 2.0 and less than or equal to 4.5.

The present invention is also effective particularly in a laminated glass for vehicles having an information transmission/reception area in the upper-side peripheral part as illustrated in FIG. 1. The configuration of the present invention enables the heat generator to efficiently clear off frost and the like stuck on the information transmission/reception area of the laminated glass; therefore, devices corresponding with ADAS (Advanced driver-assistance systems) arranged in the vehicle on the interior side of the laminated glass, such as cameras and sensors, operate normally. In particular, in the upper-side peripheral part, as the thickness of the HUD-compatible laminated glass increases, the present application is even more useful.

EXAMPLES

A pair of two glass plates having a windshield shape, a height of 1180 mm, and a width of 1480 mm were prepared.

Then, tungsten wires having a current-flowing mechanism were arranged between an interlayer and the glass plate on the interior side of a vehicle, to which pressure bonding (preliminary pressure bonding under reduced pressure and main pressure bonding in an autoclave) is applied to produce a laminated glass. In the following, the glass plate on the interior side of the vehicle will be referred to as the inner plate, and the glass plate on the exterior side of the vehicle will be referred to as the outer plate.

Figure 5:
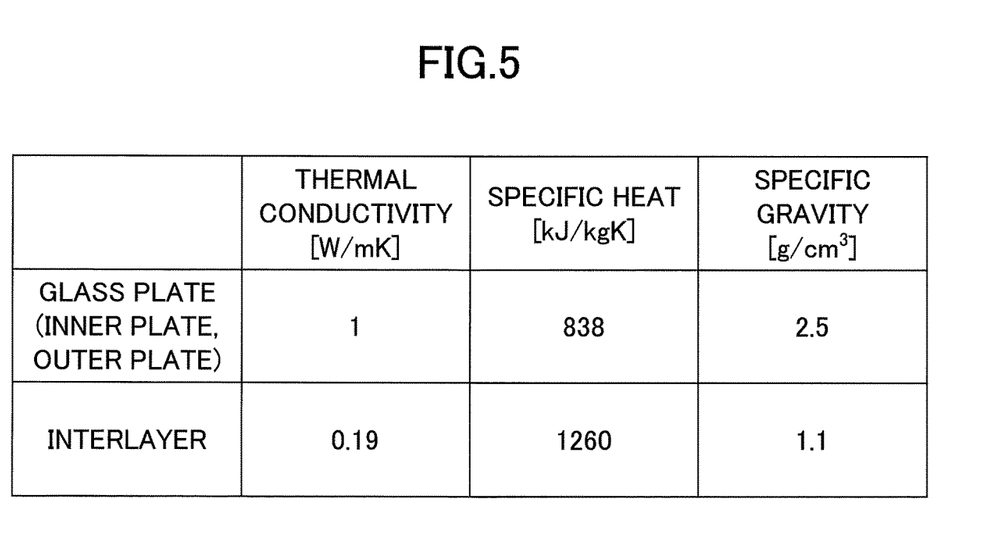
FIG. 5 is a first diagram illustrating examples and a comparative example.
Figure 6:
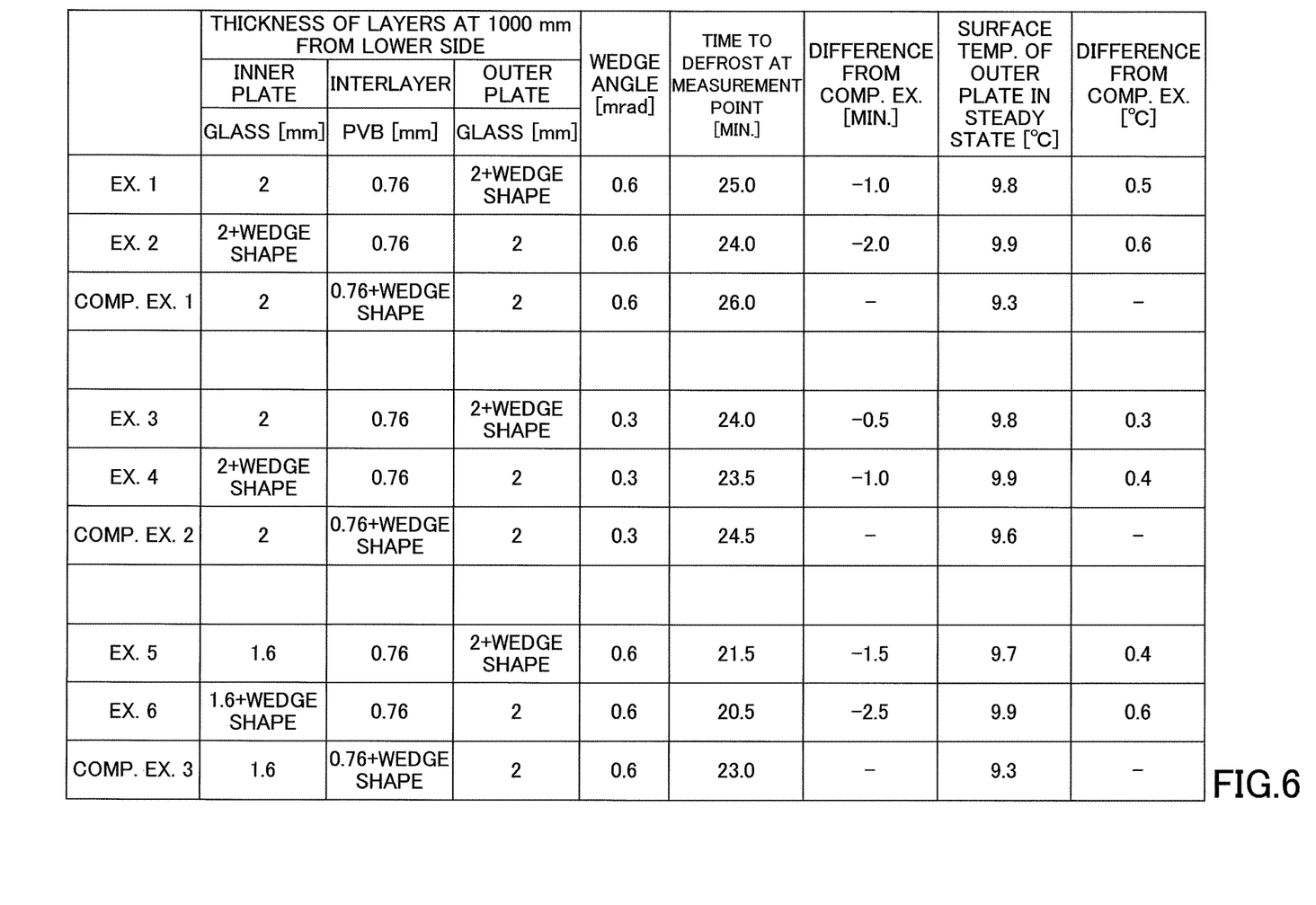
FIG. 6 is a second diagram illustrating examples and a comparative example.

Note that the physical properties of the prepared glass plates and the interlayer were as shown in FIG. 5, and the configurations of produced laminated glasses were as illustrated in Examples 1 to 6 and Comparative Examples 1 to 3 in FIG. 6. Note that in FIG. 6, for example, "2" indicates that the thickness is 2 mm and is uniform, and for example, "2+WEDGE SHAPE" indicates that the thickness on the lower side is 2 mm and has a wedge shape in cross section. In these Examples and Comparative Examples, soda-lime glass (product name FL: manufactured by AGC Inc.) was used for the glass plates, and PVB (product name QZH1: manufactured by Eastman Chemical Company) was used for the interlayer.

As illustrated in FIG. 6, in Examples 1 to 6, the inner plate (on the interior side of the vehicle) or the outer plate (on the exterior side of the vehicle) was formed to have a wedge shape in cross section, and the interlayer was formed to have a uniform layer thickness. Also, in Comparative Examples 1 to 3, the interlayer had a wedge shape in cross section, and both the inner plate and the outer plate had uniform plate thicknesses. Also, the laminated glasses of Examples 1 to 6 and Comparative Examples 1 to 3 illustrated in FIG. 6 were adjusted to have a heat generation amount of 1000 W/m$^2$ by changing the thickness of the tungsten wires and the applied voltage.

Then, the laminated glasses of Examples 1 to 6 and Comparative Examples 1 to 3 were left in an environment at −20° C. for a sufficient period of time, and confirmed that the actual temperature of the glass had reached −20° C., and put in a state of having frost on the front surface of the outer plate.

Next, in this state, the laminated glasses of Examples 1 to 6 and Comparative Examples 1 to 3 were evaluated. Specifically, for each of the laminated glasses, heat was generated by the heat generation amount of 1000 W/m$^2$, and the time to clear off the frost at the location where the distance from the lower side was 1000 mm, namely, at the location where the thickness of the laminated glass was thick, was measured. Also, for each of the laminated glasses, the surface temperature of the glass plate on the exterior side of the vehicle at the position where the distance from the lower side was 1000 mm was measured when having transitioned to a steady state.

From Examples 1 and 2 and Comparative Example 1 in FIG. 6, in the case where the inner plate or the outer plate was formed to have a wedge shape in cross section with a wedge angle of 0.6 mrad (Examples 1 and 2), it was confirmed that the time to clear off the frost at the measurement point was shorter and the surface temperature of the outer plate in the steady state was higher than in the case (Comparative Example 1) in which the interlayer was formed to have a wedge shape in cross section with the wedge angle of 0.6 mrad.

Also, from Examples 3 and 4 and Comparative Example 2 in FIG. 6, in the case where the inner plate or the outer plate was formed to have a wedge shape in cross section with a wedge angle of 0.3 mrad (Examples 3 and 4), it was confirmed that the time to clear off the frost at the measurement point was shorter and the surface temperature of the outer plate in the steady state was higher than in the case (Comparative Example 2) in which the interlayer was formed to have a wedge shape in cross section with the wedge angle of 0.3 mrad.

Also, from Examples 5 and 6 and Comparative Example 3 in FIG. 6, in the case where the inner plate or the outer plate was formed to have a wedge shape in cross section with a wedge angle of 0.6 mrad (Examples 5 and 6), it was confirmed that the time to clear off the frost at the measurement point was shorter and the surface temperature of the outer plate in the steady state was higher than in the case (Comparative Example 3) in which the interlayer was formed to have a wedge shape in cross section with the wedge angle of 0.6 mrad.

Also, from Examples 1 and 2 and Examples 3 and 4 in FIG. 6, it could be understood that a greater wedge angle brought a more remarkable effect of forming the inner plate or the outer plate to have a wedge shape in cross section.

Also, from Examples 1 and 2 and Examples 5 and 6 in FIG. 6, a thinner plate thickness at the thinnest part of the inner plate brought a more remarkable effect of efficiently transmitting the heat from the tungsten wires to the outside of the vehicle. This is because a thinner inner plate makes the specific heat of the glass smaller, and the heat that would be used for increasing the temperature of the inner plate can be distributed to the other part.

Also, from Examples 1 to 6 in FIG. 6, the cases where the inner plate was formed to have a wedge shape in cross section showed more remarkable effects of efficiently transmitting the heat from the tungsten wires to the outside of the vehicle.

In this way, in the laminated glasses, it was confirmed that the heat from the tungsten wires as the heat generator could be efficiently transmitted to the outside of the vehicle by forming the inner plate or the outer plate, which had a higher thermal conductivity than the interlayer, to have a wedge shape in cross section.

Also, each of the laminated glasses in Examples had a wedge shape in cross section having a predetermined wedge angle in the HUD display area; therefore, no HUD double image was generated, and the HUD quality was good.

As above, the preferred embodiments and the like have been described in detail. Note that various modifications and substitutions can be made to the above-described embodiments and the like, without deviating from the scope described in the claims.

The invention claimed is:

1. A laminated glass comprising:
   a first glass plate to be positioned on an exterior side of a vehicle;
   a second glass plate to be positioned on an interior side of the vehicle;
   an interlayer positioned between the first glass plate and the second glass plate;
   a heat generator positioned on a principal surface on a vehicle-exterior side of the second glass plate,
   wherein at least one of the first glass plate and the second glass plate is a wedged glass plate which has a wedge shape in cross section thereof,
   wherein a maximum value of a layer thickness of the interlayer is less than or equal to 1 mm, and
   wherein the wedged shape of the wedged glass plate has a wedge angle on each point in a line connecting a midpoint of an upper side of the wedged glass plate and a midpoint of a lower side of the wedged glass plate, and the wedge angle above a center of the line is smaller than the wedge angle below the center of the line.

2. The laminated glass as claimed in claim 1, wherein each of the wedge angles of the wedged glass plate is greater than or equal to 0.2 mrad and less than or equal to 1.0 mrad.

3. The laminated glass as claimed in claim 1, wherein the first glass plate is the wedged glass plate.

4. The laminated glass as claimed in claim 1, wherein the second glass plate is the wedged glass plate.

5. The laminated glass as claimed in claim 1, wherein a thermal conductivity of the interlayer is less than or equal to 0.3 W/mK.

6. The laminated glass as claimed in claim 1, wherein the interlayer comprises at least one resin selected from the group consisting of a polyvinyl acetal resin and a vinyl acetate copolymer resin.

7. The laminated glass as claimed in claim 1, wherein the interlayer is a sound insulation performance improving film having three or more layers.

8. The laminated glass as claimed in claim 1, wherein a heat generation amount per unit area of the heat generator is greater than or equal to 400 W/m$^2$ and less than or equal to 1200 W/m$^2$.

9. The laminated glass as claimed in claim 1, wherein a ratio of a plate thickness of the wedged glass plate to a layer thickness of the interlayer at a corresponding position (the plate thickness of the wedged glass plate/the layer thickness of the interlayer) is greater than or equal to 0.7 and less than or equal to 5.0.

10. The laminated glass as claimed in claim 1, further comprising:
    an information transmission/reception area in an upper-side peripheral part of the laminated glass.

11. The laminated glass as claimed in claim 10, wherein a camera is mounted on the information transmission/reception area.

12. The laminated glass as claimed in claim 1, wherein a thermal conductivity of the wedged glass plate at room temperature is 0.3 to 1.3 W/mK.

13. The laminated glass as claimed in claim 1, wherein the interlayer comprises one or more layers, and only one plate or layer among the first glass plate, the second glass plate, and the one or more layers has, in cross section thereof, a wedge angle in a range of greater than or equal to 0.2 mrad and less than or equal to 1.0 mrad.

* * * * *